April 21, 1964   L. W. GRUBB   3,129,493
METHODS FOR THE MANUFACTURE OF LIGHTWEIGHT STRUCTURAL MEMBERS
Filed June 20, 1961   4 Sheets-Sheet 1
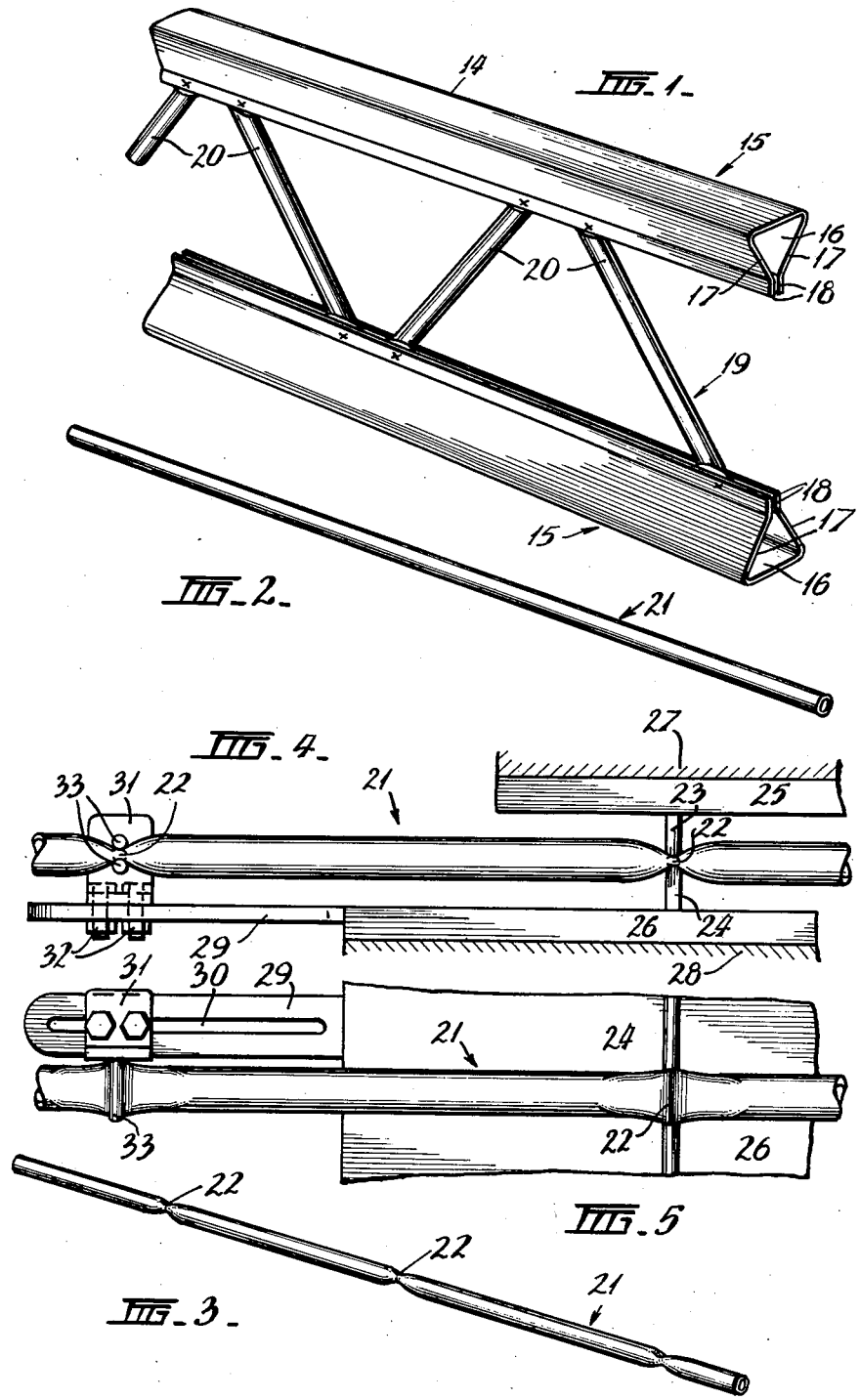

United States Patent Office 3,129,493
Patented Apr. 21, 1964

3,129,493
METHODS FOR THE MANUFACTURE OF
LIGHTWEIGHT STRUCTURAL MEMBERS
Lewis William Grubb, West Hobart, Tasmania, Australia, assignor to Charles Davis Limited, Hobart, Tasmania, Australia, a company of Australia
Filed June 20, 1961, Ser. No. 118,433
6 Claims. (Cl. 29—155)

This invention relates to a method of the manufacture of light-weight lattice structural members of the type having top and bottom chords comprising hollow members of triangular cross-section with the sides of the hollow members extending to form two parallel spaced webs or flanges and which latter webs or flanges are connected at spaced points to diagonal braces in the form of a continuous length of tubing to form a lattice web between the chord members of the structure.

The principal object of the present invention is to provide a convenient and economical method of producing structural members of the type above described.

A further object of the invention is to provide a selection of materials for producing the structural members of the type referred to whereby the method of the invention may be most effectively achieved to provide light-weight structural members of high loading capacity.

In order that the invention may be more readily understood reference will now be made to the accompanying drawings. In the drawings:

FIG. 1 is a perspective view of a light-weight lattice girder, truss or joist construction of the type referred to, having top and bottom chords being hollow members of triangular cross-section and connected at spaced points to diagonal tubular braces.

FIG. 2 is a perspective view of a length of tubing prior to being shaped to form the diagonal braces in a structure of the type illustrated in FIG. 1.

FIG. 3 is a perspective view of the length of tubing having spaced crimps therein.

FIGS. 4 and 5 are elevation and plan views respectively of die members for crimping the tube.

Figure 7:
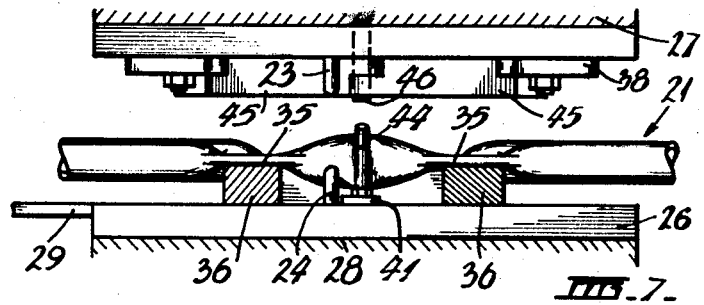
FIG. 7 is a view in front elevation of the upper and lower die members for flattening the tubing on each side of the crimps.

According to the invention the method of producing structural members of the kind above described comprises the steps of crimping a length of tubing at required spaced intervals, rotating the tube about its axis through an angle of 90°, flattening the tube at converging angles on each side of the crimps, bending the tube in alternate directions in the one plane on said crimps to form a zig-zag lattice, inserting the bent and flattened portions on each side of the lattice between the sides of previously formed chord members, and finally attaching the sides of the chord members to the flattened portions of the lattice to complete the assembly of the structure. The tube is preferably attached to the chord members at the flattened portions by a spot-welding operation.

The top and bottom chords or flanges of the structure are preferably formed from steel strip having a carbon content of .125, sulphur .036, phosphorous .016 and manganese .45 and the tubing forming the lattice preferably formed from an electric resistance welded semi-bright steel tubing.

FIG. 1 illustrates a light-weight structural member 14 in the form of a lattice girder usable as a truss, rafter, joist or the like in metal structures and includes two chord members 15 each comprising a hollow member 16 of triangular cross-section with the converging sides 17 extending to form two parallel spaced webs or flanges 18. The lattice web 19 between the chords 15 is formed by zig-zag diagonal tubes 20 which is lattice web formed from a continuous length of tubing.

According to the present invention the chord members 15 are formed from steel strip having a carbon content of .125, sulphur .036, phosphorous .016 and manganese .45. The lattice web 19 is formed from an electric resistance welded semi-bright steel tubing. In one example the chords 15 are preformed from 8" wide 14 gauge steel strip having the above chemical analysis, said strip having a yield point of 35,000 lbs. per square inch. The tubing is 1" diameter x 17 gauge having an ultimate yield strength of 69,000 lbs. per square inch. With these materials spot-welding of the webs or flanges 18 of the chords 15 to the tubing provides minimum failure loads around 9,000 lbs. and it is consequently considered that working loads of 4,000 lbs. are safe. With the diagonal tubes 20 making angles of about 50° with the chords 15 the permissable shear forces in the structure is limited to 4,000 cos 40° or about 3,000 lbs.

The method of forming the lattice web 19 of the structural member 14 from a length of tubing 21 (FIG. 2) comprises crimping the tube 21 as at 22 (FIG. 3) from opposite sides at selected spaced intervals in the same axial plane along the length of the tube. The spacing of crimps 21 is determined by the depth of the lattice 19 to be formed and the angle of the lattice relatively to the chord members 15.

The crimping operation may be effected by a simple press operation as shown in FIGURES 4 and 5 wherein upper and lower crimping jaws 23 and 24 are respectively carried on upper and lower die members 25 and 26. The upper die member 25 is carried on the ram of a press, shown diagrammatically at 27 and the lower die member 26 mounted on the base of the press shown diagrammatically at 28.

The lower die member 26 has an extending arm 29, slotted as at 30. An angle bracket 31 is adjustably mounted on the arm 29 by means of bolts 32, said bracket 31 having two spaced projecting pins 33 extending from the vertical arm 34 of the bracket 31 and are adapted to engage a previously formed crimp 22 to locate or position the tube 21 so that a subsequently formed crimp will be formed at the required distance from the said previously formed crimp, and that all crimps will be formed in the same axial plane.

Figure 8:
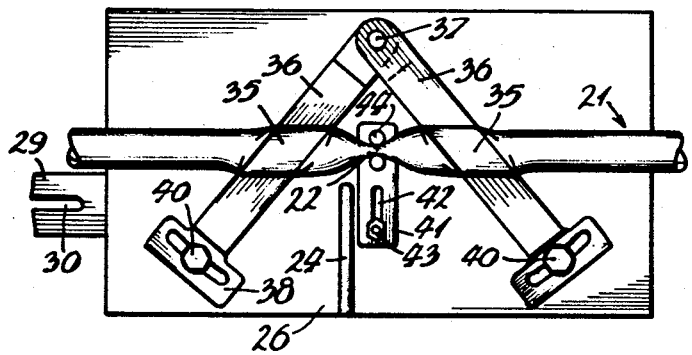
FIG. 8 is a plan view of the lower of the die members shown in FIG. 7.
Figure 6:
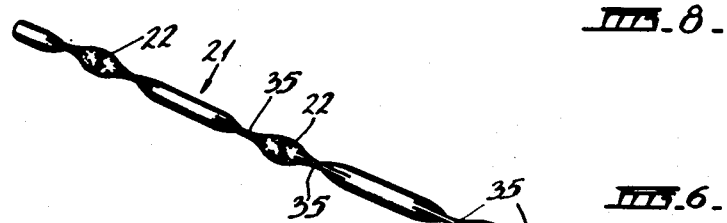
FIG. 6 is a perspective view of the crimped tube having converging flattened portions on each side of the crimps after rotating the tube about its axis through an angle of 90°.

As illustrated in FIG. 6, the tube 21 is flattened, as at 35, at converging angles shown in more detail in FIGS. 7 and 8. The flattening operation is effected on the same die members 25 and 26 in which the bottom die member 26 has secured thereto two angularly arranged arms 36 which are hinged together at their meeting ends on a pivot pin 37. The other ends of said arms 36 are angularly adjustable to each other about said pivot 37. Flattened ends 38 on the arms 36 are slotted as at 39 to receive locking bolts 40 screwed into the die member 26 to maintain the arms 36 in a selected adjusted angular relationship.

Located between the arms 36 is a plate 41 slotted at 42 and adjustable movable on the die member 26 by means of locking bolt 43, said plate has two vertical locating pins 44 adapted to engage on either side of a crimp 22 in the tubing and thereby correctly locate the tubing for the flattening operation after the crimping operation and so that the flats 35 are formed in a plane at 90° to that of the crimps 22.

The upper die member 25 is provided with two angularly adjustable arms 45 pivoted as at 46 and maintained in adjusted position in the same manner as the arms 36 on the lower die member.

Figure 9:
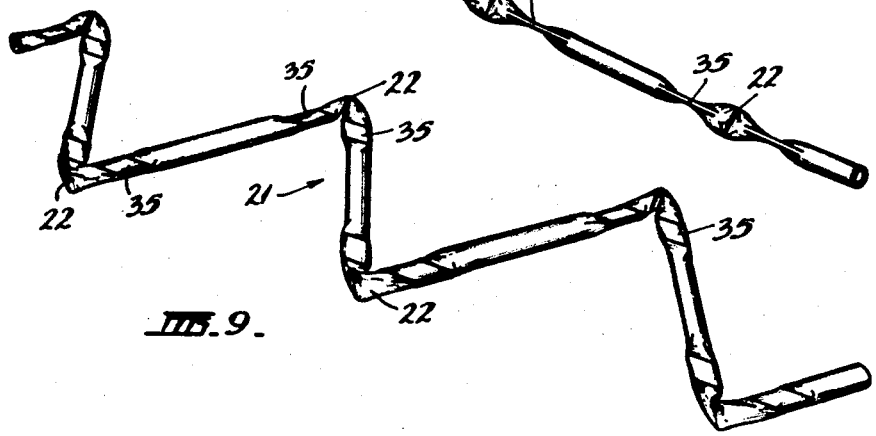
FIG. 9 is a perspective view of the crimped and flattened tube, bent on the crimps into a zig-zag formation.

On completion of the flattening operation the tube 21 is bent about the crimps 22 into the zig-zag formation shown in FIG. 9, so that the pair of flats 35 on each side of each crimp 22 are aligned to each other.

Figure 10:
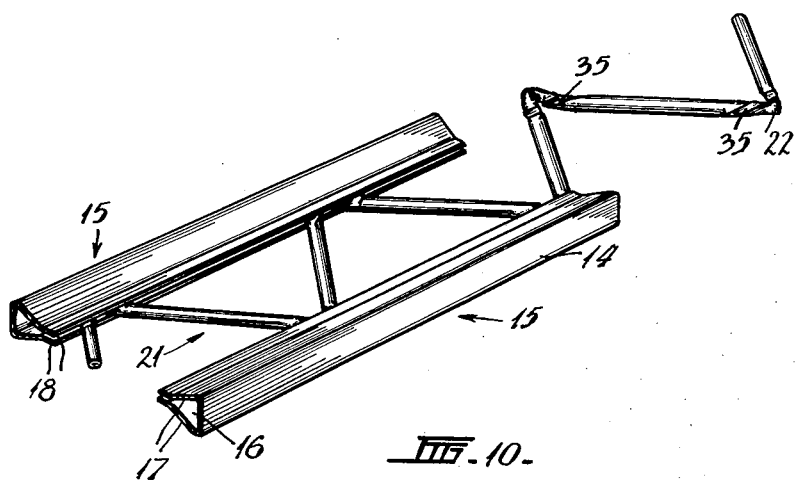
FIG. 10 is a perspective view of the formed tube being inserted into two chord members to form the assembly shown in FIG. 1.

The tubing in the zig-zag formation is then inserted into chord members 15, the flats 35 entering between the webs or flanges 18 of the chords and bent crimps 22 being accommodated in between the converging sides 17 of the chords as shown in FIG. 10.

Figure 11:
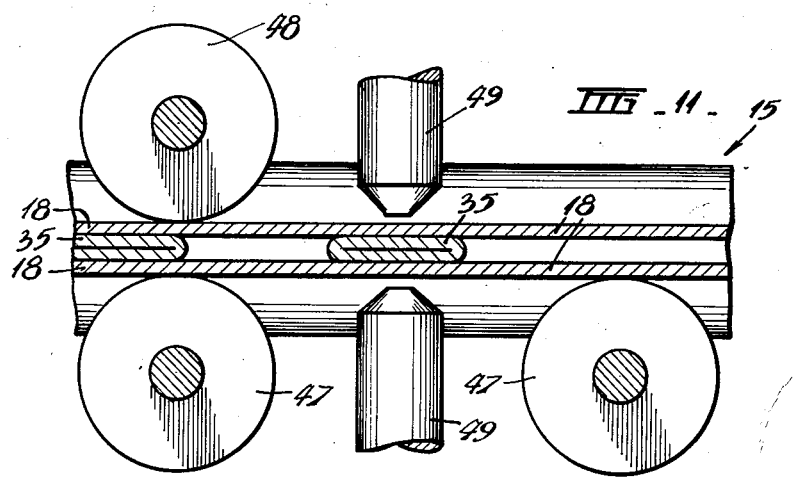
FIG. 11 is a detail view showing one of the chord members passing through a spot-welding machine to attach the chord member to the flattened portions of the tube.

The flats 35 are then spot-welded to the webs or flanges 18 and as illustrated in FIG. 11 each chord 15 is supported on rollers 47 and guide roller 48 to pass the flanges 18 between the electrodes 49 of a spot-welding machine.

Trusses made in accordance with the present invention are very light, weighing about 5.5 lbs. foot but have very high loading capacities in comparison to their weight. In testing all set-ups have been designed to give not only the failure loads of trusses but also to furnish information on their behaviour under load and, in particular, to enable strains in critical members to be measured and compared with calculated values.

The following are estimated allowable shear force and moments (load factor 2.0) of trusses of various depths:

| Overall depth of truss in inches | Single truss | | Double truss | |
|---|---|---|---|---|
| | Safe shear force, lbs. (V) | Safe bending moment in lb. (M) | (V) | (M) |
| 10 | 2,400 | 65,000 | | |
| 12 | 2,400 | 86,000 | 4,000 | 172,000 |
| 14 | 2,400 | 105,000 | 4,000 | 218,000 |
| 16 | 2,400 | 130,000 | 4,000 | 260,000 |
| 18 | 2,100 | 150,000 | 3,500 | 300,000 |

It will be apparent that a lightweight truss in accordance with the present invention achieves a balance whereby the minimum amount of steel is used for maximum mechanical strength.

Figure 12:
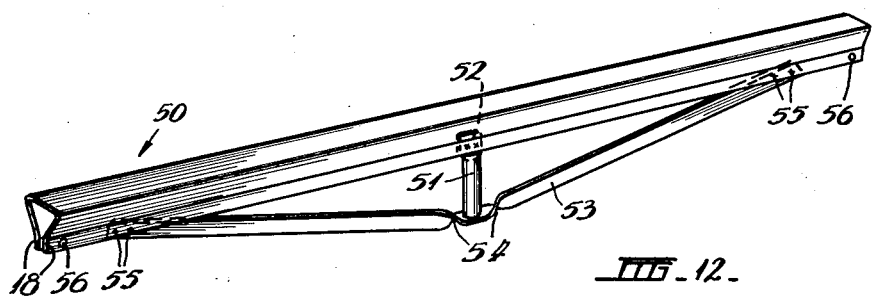
FIG. 12 is a perspective view of a purlin formed from a hollow member similar to that forming the chords of the structural members illustrated in FIGS. 1 and 10.
Figure 13:
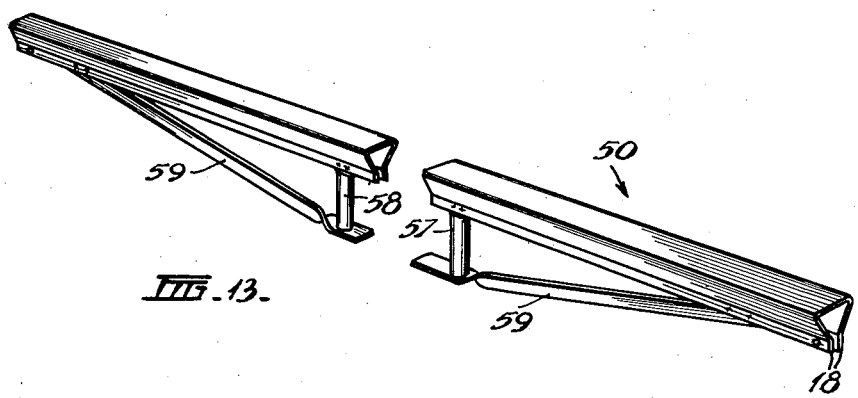
FIG. 13 is a similar view to FIG. 12 of an alternative form purlin.

Purlins for use with structural members above described are illustrated in FIGS. 12 and 13 and comprise a hollow triangular-section member 50 similar to those forming the chords 15 of the above described structural members. The purlin illustrated in FIG. 13 comprises a length of said section-member 50 with a central 1" diameter, 17 gauge tube as strut 51, one end of which is flattened as at 52 and spot-welded between the spaced parallel webs 18 of said section. A flat mild steel tension member 53 is welded to the outer end of the strut 51 and twisted at 90° on each side of the strut as at 54 and then continuing to within approximately 3" of each end of the section and between the webs 18 where the ends of the strut are double spot-welded, as at 55, to the webs 18 of the member 50. A hole 56 is drilled at each end of the section through the webs 18 for attaching the purlin to purlin cleats.

As shown in FIG. 13 a second embodiment of the purlin is shown in the same hollow member 50 is provided and in which two struts 57 and 58 formed and fixed in the same manner as the strut 51. The tension member 59 being welded to the struts 57 and 58 and twisted through 90° as in the previously described embodiment. The ends of the tension member 59 being double spot-welded between the webs 18 as above described with a hole 56 being provided at each end for attaching the purlin to purlin cleats.

Figure 14:
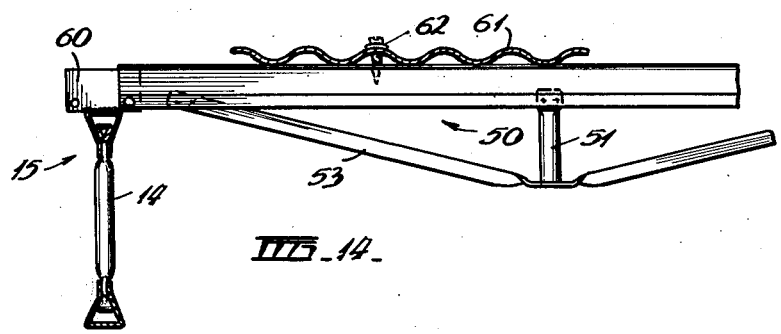
FIG. 14 is a view illustrating the purlin shown in FIG. 12 fixed in position to purlin cleats attached to the top chords of structural members of the type referred to forming rafters in a roof structure.

FIG. 14 illustrates the purlin shown in FIG. 12 attached to purlin cleats 60 welded to the upper surface of the upper chord 15 of structural members 14 forming rafters of the roof of a building structure. Roofing such as corrugated roofing 61 may be secured to the purlin as by self tapping screws 62.

What I claim is:

1. A method of producing structural members of the kind specified comprising the steps of crimping a length of tubing at spaced intervals, flattening the tube at converging angles on each side of the crimps, bending the tube in alternate directions on said crimps to form a zig-zag lattice, inserting the bent and flattened portions on each side of the lattice, between the sides or previously formed chord members, and finally attaching the sides of the chord members to the flattened portions of the lattice to complete the assembly of the structure.

2. A method of producing structural members of the kind specified comprising the steps of crimping a length of tubing at spaced intervals, rotating the tube about its axis through an angle of 90°, flattening the tube at converging angles on each side of the crimps, bending the tube in alternate directions in the one plane on said crimps to form a zig-zag lattice, inserting the bent and flattened portions on each side of the lattice between the sides of previously formed chord members, and finally attaching the sides of the chord members to the flattened portions of the lattice to complete the assembly of the structure.

3. A method of producing structural members of the kind specified comprising the steps of pressing the walls of a length of tubing at spaced intervals to form a series of crimps therein, rotating the crimped tube about its axis through an angle of 90°, pressing the walls of the tubing together on each side of the crimps to form flattened portions converging towards the adjacent crimp, bending the tube in alternate directions in the one plane on said crimps to form a zig-zag lattice, inserting the bent portions on each side of the lattice into the hollow previously formed chord members with the flattened portions being disposed between parallel extending webs or flanges formed on the chord members and finally spot-welding the said webs or flanges to flattened portions of the lattice to complete the assembly of the structure.

4. A method of producing structural members of the kind specified comprising the steps of crimping at spaced intervals length of electric resistance welded semi-bright steel tubing, flattening the tube at converging angles on each side of the crimps, bending the tube in alternate directions on said crimps to form a zig-zag lattice, inserting the bent and flattened portions on each side of the lattice between the sides of hollow chord members of triangular cross-section, said chord members being previously formed from steel strip having a carbon content of .125, sulphur .036, phosphorous .016 and manganese .45, and finally spot-welding the sides of the chord members to the flattened portions of the lattice to complete the assembly of the structure.

5. A method of producing structural members of the kind specified as claimed in claim 4 and wherein the tubing is of 1" diameter x 17 gauge having an ultimate yield strength of 69,000 lbs. per square inch.

6. A method of producing structural members of the kind specified as claimed in claim 4 and wherein the chord members are preformed from 8″ wide x 14 gauge steel strip having a yield point of 35,000 lbs. per square inch.

References Cited in the file of this patent

UNITED STATES PATENTS

| | | |
|---|---|---|
| 1,813,373 | Wooldridge | July 7, 1931 |
| 1,908,757 | Hathorn | May 16, 1933 |
| 2,473,976 | Timm | June 21, 1949 |
| 2,495,533 | Macklin et al. | Jan. 24, 1950 |
| 2,662,272 | Macomber | Dec. 15, 1953 |
| 2,771,117 | Le Febvre et al. | Nov. 20, 1956 |
| 2,939,206 | Keller | June 7, 1960 |